United States Patent
Mashburn et al.

(10) Patent No.: US 10,086,415 B2
(45) Date of Patent: Oct. 2, 2018

(54) METHOD AND APPARATUS FOR PURIFYING AND RECYCLING SYNTHETIC TURF

(71) Applicant: APT Advanced Polymer Technology Corp., Harmony, PA (US)

(72) Inventors: Larry E. Mashburn, Dalton, GA (US); David A. Brown, Jr., Chatsworth, GA (US); Timothy J. Gentry, Sr., Talking Rock, GA (US)

(73) Assignee: APT ADVANCED POLYMER TECHNOLOGY CORP., Harmony, PA (US)

( * ) Notice: Subject to any disclaimer, the term of this patent is extended or adjusted under 35 U.S.C. 154(b) by 908 days.

(21) Appl. No.: 14/250,209

(22) Filed: Apr. 10, 2014

(65) Prior Publication Data

US 2014/0265011 A1    Sep. 18, 2014
US 2018/0117647 A9    May 3, 2018

Related U.S. Application Data

(63) Continuation-in-part of application No. 13/672,227, filed on Nov. 8, 2012, now Pat. No. 9,259,861, and a
(Continued)

(51) Int. Cl.
   *B28B 3/20*         (2006.01)
   *B09B 3/00*         (2006.01)
   (Continued)

(52) U.S. Cl.
   CPC ............... *B09B 3/00* (2013.01); *B29B 9/10* (2013.01); *B29B 17/02* (2013.01); *E01C 13/08* (2013.01); *B29B 2017/0217* (2013.01)

(58) Field of Classification Search
   CPC . B09B 3/00; B29L 39/10; B29L 17/02; B29L 17/0206; C08J 11/06; A41G 1/009;
   (Continued)

(56) References Cited

U.S. PATENT DOCUMENTS 5,595,696 A    1/1997    Schlarb
5,859,071 A    1/1999    Young et al.
(Continued)

FOREIGN PATENT DOCUMENTS

EP    0185646      6/1986
EP    2387875      11/2011
(Continued)

OTHER PUBLICATIONS

International Search Report and Written Opinion dated Aug. 27, 2014, in PCT/US2014/033679.
(Continued)

*Primary Examiner* — Stella Kim Yi
(74) *Attorney, Agent, or Firm* — Harness, Dickey & Pierce, P.L.C.

(57) ABSTRACT

A method and apparatus for purifying and recycling synthetic turf are provided. The method includes removing a section of used synthetic turf, feeding the section to a rotating beater to knock sand infill loose, and passing the section through a rotating brush roll wherein a turf filament surface is directly contacted by the rotating brush roll to knock any entrained infill material loose from the section of used synthetic turf.

9 Claims, 10 Drawing Sheets

Related U.S. Application Data continuation-in-part of application No. 12/638,656, filed on Dec. 15, 2009, now Pat. No. 9,011,740.

(60) Provisional application No. 61/810,538, filed on Apr. 10, 2013, provisional application No. 61/122,592, filed on Dec. 15, 2008, provisional application No. 61/557,073, filed on Nov. 8, 2011.

(51) Int. Cl.
  B29B 17/02 (2006.01)
  E01C 13/08 (2006.01)
  B29B 9/10 (2006.01)

(58) Field of Classification Search
  CPC .......... E01C 13/08; B29B 9/10; B29B 17/02; B29B 17/0206
  See application file for complete search history.

(56) References Cited

U.S. PATENT DOCUMENTS

| | | |
|---|---|---|
| 6,428,298 B1 | 8/2002 | Clauss |
| 6,814,826 B1 | 11/2004 | Bell |
| 6,838,030 B2 | 1/2005 | Hashimoto |
| 8,110,131 B1 | 2/2012 | Dell'Orco et al. |
| 2005/0206029 A1 | 9/2005 | Moore, Jr. |
| 2007/0043128 A1 | 2/2007 | Jenkines |
| 2008/0113146 A1 | 5/2008 | Wright |
| 2008/0128933 A1 | 6/2008 | Przbylinski |
| 2010/0151158 A1* | 6/2010 | Mashburn ........... B29B 17/0206 428/17 |
| 2010/0247814 A1 | 9/2010 | Nisikawa et al. |
| 2010/0319510 A1 | 12/2010 | Bearden |
| 2012/0309858 A1 | 12/2012 | Taylor |
| 2012/0315816 A1 | 12/2012 | Fowler |
| 2013/0064996 A1 | 3/2013 | John H Bearden |
| 2013/0078394 A1* | 3/2013 | Taylor ................... C08L 23/06 428/17 |

FOREIGN PATENT DOCUMENTS

| | | | |
|---|---|---|---|
| JP | 2007132116 | * | 5/2007 |
| WO | 2013042817 | | 3/2013 |

OTHER PUBLICATIONS

Final Office Action dated Dec. 15, 2016, in U.S. Appl. No. 14/664,102.

\* cited by examiner

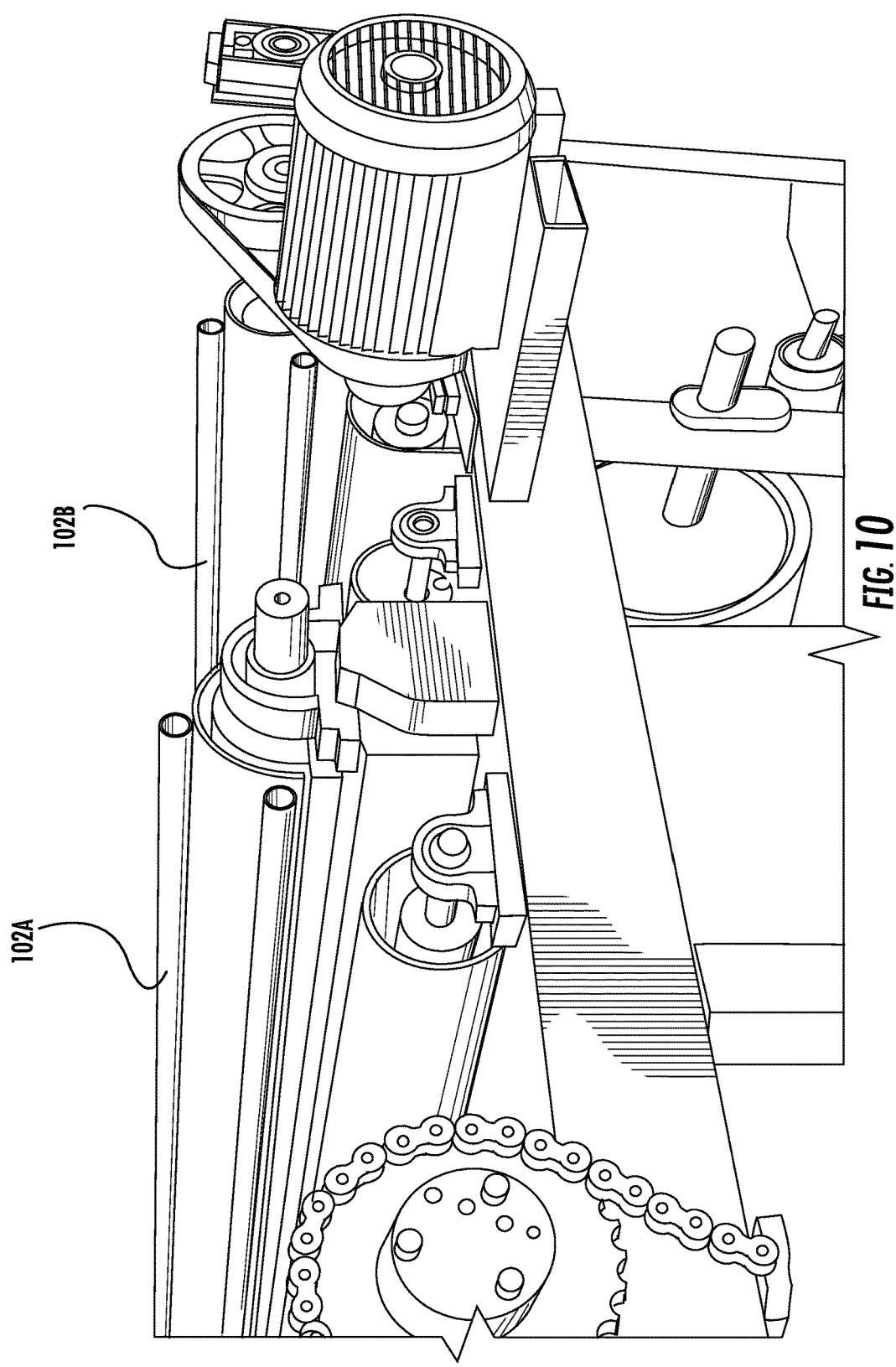

METHOD AND APPARATUS FOR PURIFYING AND RECYCLING SYNTHETIC TURF

CROSS REFERENCES TO RELATED APPLICATIONS

This application claims priority to U.S. provisional patent application Ser. No. 61/810,538 entitled "Method and Apparatus for Purifying and Recycling Synthetic Turf" which was filed on Apr. 10, 2013, the entire content of which is incorporated herein by reference. This application also claims priority to co-pending U.S. nonprovisional patent application Ser. No. 13/672,227 entitled "METHOD OF RECYCLING SYNTHETIC TURF" which was filed on Nov. 8, 2012, which claims priority to U.S. provisional patent application Ser. No. 61/557,073 entitled "METHOD OF RECYCLING SYNTHETIC TURF" which was filed on Nov. 8, 2011, and is also a continuation-in-part of co-pending U.S. nonprovisional patent application Ser. No. 12/638,656 entitled "Method of Recycling Synthetic Turf and Infill Product" and claiming priority thereto, which was filed on Dec. 15, 2009, which further claims priority to U.S. provisional patent application Ser. No. 61/122,592 entitled "METHOD OF RECYCLING SYNTHETIC TURF", which was filed on Dec. 15, 2008.

FIELD

This application is related to the field of synthetic turf, and more particularly to methods and apparatuses for purifying and recycling synthetic turf.

BACKGROUND

Synthetic turf has been used for years in athletic playing surfaces such as football, baseball, and soccer fields, and has more recently been used in other applications where an alternative to natural grass is desired. These applications include, for example, playgrounds, residential and commercial lawns, landscaping, jogging paths, paintball fields, tennis courts, putting greens, and dog runs. Typically, synthetic turf includes a pile fabric having a backing and a plurality of upstanding ribbons, also called face fibers or filiform formations, resembling natural grass. Many synthetic turf products also include an infill material dispersed among the upstanding ribbons, which may include sand, tire rubber crumb, and/or other particulates, either singularly or in combination with each other. The infill material simulates soil in natural turf, acts as a ballast, and/or contributes to the physical properties of the turf, such as resiliency, that make the turf suitable for a particular use.

Synthetic turf has a limited useful life, the length of which depends on the construction of the turf, the application for which it is used, and how the turf is maintained. As an example, a typical synthetic turf for use as an athletic field may have a useful life of from about 8 to 15 years. A large amount of synthetic turf is currently being used in hundreds of athletic fields and in other applications. To avoid sending that turf to landfills at the end of its useful life, there is a need for a method of recycling and reusing all or portions of the synthetic turf. There is also a need for a synthetic turf that is recyclable.

Recycling of a product typically refers to converting that product into a material or product for another use or extracting at least one of the individual components or materials of the product for use of that component or material in another product. The recycled product may be used in a similar product, such as when paper products are recycled to make other paper products, or may be used in a completely different product, such as when tires are recycled to make asphalt.

Many synthetic turf products include components that are not found in carpet and that are incompatible with, or at least undesirable in, conventional carpet recycling methods. For example, conventional carpet does not include infill. Typical infill materials for synthetic turf installations include sand, tire rubber crumb, and/or other particulates, either singularly or in combination with each other. Thus, recycling synthetic turf presents a unique problem not encountered in the recycling of carpet.

U.S. Patent Application Publication Number 2012/0315816 entitled "Methods of Recycling Synthetic Turf, Methods of Using Reclaimed Synthetic Turf, and Products Comprising Same" to Fowler et al. describes a process to recycle synthetic turf either by using an agglomeration step or feeding turf fragments directly into an extruder to form extrudates in various forms. The Fowler application makes brief mention that turf infill can be removed by hand or by machine in paragraph [0040], but no other specific information is given regarding the importance of and degree of removal that is desirable for such process.

U.S. Patent Application Publication Number 2012/0309858 entitled "Method for Recycling Synthetic Turf and Product" to Taylor et al. mentions some desirable percentage ranges of turf infill removal, but only information regarding onsite turf infill removal equipment is described or otherwise suggested (e.g., the "Turf Muncher" brand apparatus available from Field Away of Dalton, Ga.). Mention is made of simply turning turf upside down and beating the turf to remove infill if a "Turf Muncher" is unavailable.

Nonetheless, as explained in more detail herein, there remains a need for an improved method and apparatus for efficiently recycling and reusing an existing synthetic turf to avoid sending the entire synthetic turf to a landfill when it is no longer useful.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 10 shows the turf purification apparatus of FIGS. 8 and 9 at rest.

DETAILED DESCRIPTION

Figure 1:
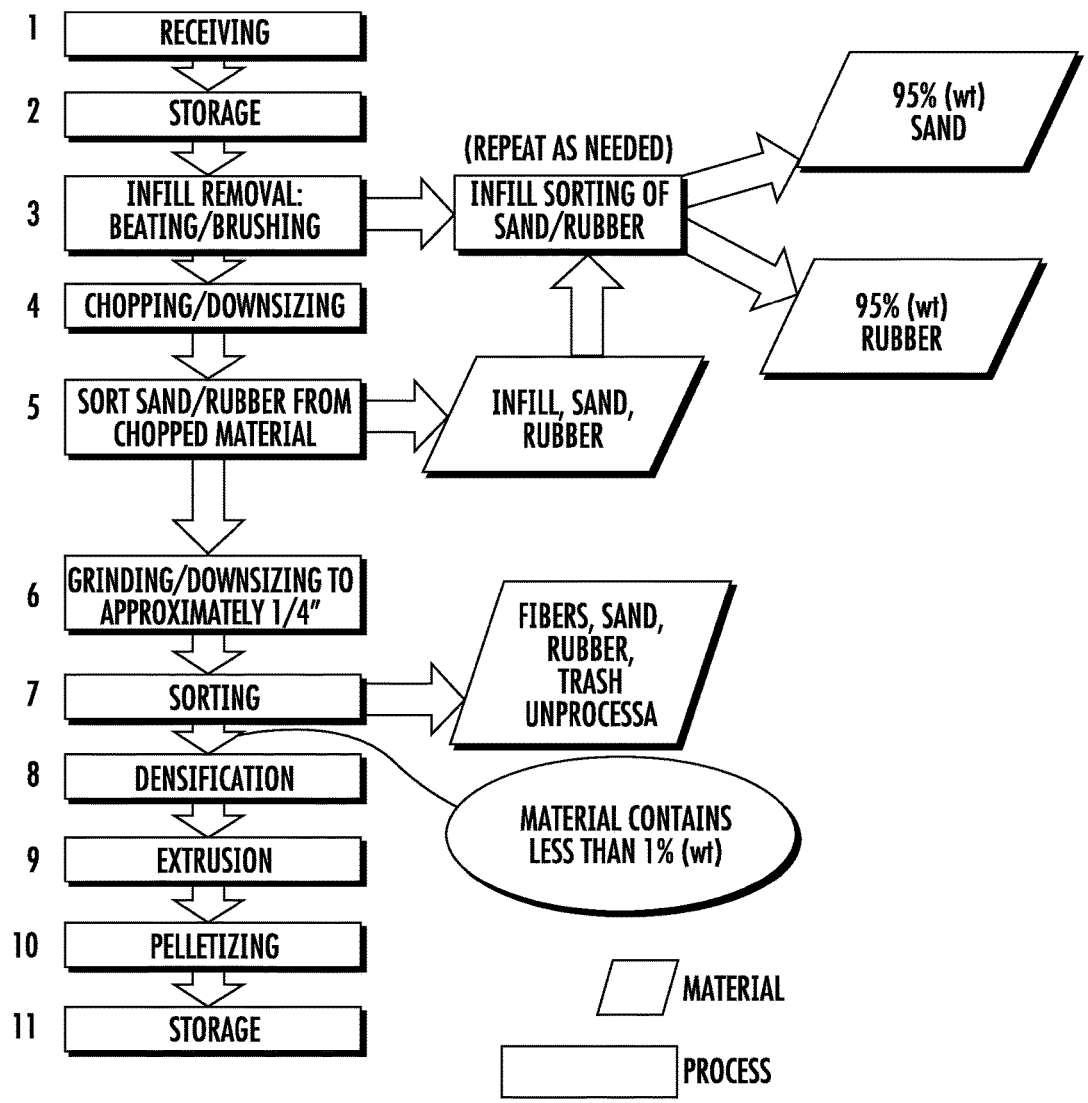
FIG. 1 shows a flow chart of a process for purifying and recycling synthetic turf.

Various terms used herein are intended to have particular meanings Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of this disclosure provide a method and apparatus for recycling and reusing an existing synthetic turf.

Synthetic Turf

Typically, the synthetic turf to be recycled using the present method and apparatus includes a pile fabric having a backing and a plurality of upstanding ribbons, also called face fibers or filiform formations, resembling grass. Typically, the upstanding ribbons are made of polyethylene, polypropylene or a blend thereof. The ribbons may also be made of nylon or any other material known in the art alone or in combination with polypropylene and/or polyethylene. These face fibers are tufted or sewn into a primary backing material which can be made of a number of different materials including, but not limited to, polypropylene and polyester. A primary coating material, or precoat, is applied to the fiber and primary backing to hold the face fibers in place. The primary coating of most synthetic turfs includes polyurethane and also typically includes a filler such as calcium carbonate or coal fly ash. Primary coatings may also include latex, hot melt adhesives, and/or thermoplastics in addition to or instead of polyurethane. Synthetic turfs may also have a secondary coating which may be similar to the primary coating described herein. Synthetic turfs may also have a secondary backing which can be made of a number of different materials including, but not limited to, polypropylene and polyester.

The face fibers typically make up from about 19 wt % to about 80 wt % of a synthetic turf. The primary backing typically makes up from about 1 wt % to about 25 wt % of a synthetic turf. The primary coating typically makes up from about 15 wt % to about 80 wt % of a synthetic turf.

Synthetic turf may also include an infill material dispersed among the upstanding ribbons, which acts as a ballast and/or contributes to the physical properties of the turf, such as resiliency, that make the turf suitable for a particular use. Synthetic turf infill may be made of any material suitable for providing desired physical properties for the synthetic turf, but most often includes materials such as sand, gravel, cork, polymer beads, and rubbers, including but not limited to crumb rubber, ethylene propylene diene monomer (EPDM) rubber, and neoprene rubber. The most common infill type used over the past quarter century is bar far silica sand in various forms and combinations with or without other infill materials.

The face fibers may include polyethylene, polypropylene, nylon, or other materials singly or in combination. The face fibers may include from about 0 wt % to about 100 wt % polyethylene, from about 0 wt % to about 100 wt % polypropylene, and from about 0 wt % to about 100 wt % nylon. In some embodiments, the face fibers include blends of polypropylene (PP) and polyethylene (PE) in any of the following ratios of PP:PE-5:95; 10:90; 50:50; 90:10; 95:5 or any ratio that is within these ranges of ratios. In some embodiments, the face fibers include blends of PP and nylon in any of the following ratios of PP:nylon-5:95; 10:90; 50:50; 90:10; 95:5 or any ratio that is within these ranges of ratios. In some embodiments, the face fibers include blends of PE and nylon in any of the following ratios of PE:nylon-5:95; 10:90; 50:50; 90:10; 95:5 or any ratio that is within these ranges of ratios. In some embodiments, the face fibers include blends of PP, PE, and nylon in any of the following ratios of PP:PE:nylon-10:10:80; 10:80:10; 80:10:10; 33:33:33 or any ratio that is within these ranges of ratios.

The primary backing may include polyester, polypropylene, and other materials singly or in combination. The primary backing may include from about 0 wt % to about 100 wt % polyester or from about 0 wt % to about 100 wt % polypropylene. In some embodiments, the primary backing includes blends of PP and polyester in any of the following ratios of PP:polyester-5:95; 10:90; 50:50; 90:10; 95:5 or any ratio that is within these ranges of ratios.

The primary coating may include polyurethane, latex, hot melt adhesive, and/or thermoplastics alone or in combination. Suitable hot melt adhesives include, but are not limited to, Reynolds 54-041, Reynolds 54-854, DHM 4124 (The Reynolds Company P.O. Greenville, S.C., DHM Adhesives, Inc. Calhoun, Ga.). Suitable thermoplastics include, but are not limited to polypropylene, polyethylene and polyester. The primary coating may also include a filler that may be coal fly ash, calcium carbonate, iron oxide, or barium sulfate, or any other filler known in the art. The primary coating may include from about 0 wt % to about 100 wt % polyurethane, from about 0 wt % to about 100 wt % latex, from about 0 wt % to about 100 wt % hot melt adhesive, and/or from about 0 wt % to about 100 wt % thermoplastic. The primary coating may include from about 0 wt % to about 80 wt % filler. In some embodiments, the primary coating includes polyurethane, latex, or thermoplastic and from about 20 wt % to about 80 wt % filler, or from about 40 wt % to about 60 wt % filler. In other embodiments, the primary coating includes hot melts and from about 0 wt % to about 50 wt % filler, or from about 1 wt % to about 25 wt % filler. Several embodiments of primary coating and secondary backing compositions are shown below in Table 1.

TABLE 1

| Sample | Polyurethane wt % | Latex wt % | Hot Melt wt % | Polypropylene wt % | Polyester wt % |
|---|---|---|---|---|---|
| 1 | 10-70 | | 10-40 | 5-40 | |
| 2 | 30-97 | | | | 3-70 |
| 3 | 10-70 | | 10-40 | | 5-40 |
| 4 | 30-97 | | | 3-70 | |
| 5 | 10-70 | 10-40 | | 5-40 | |
| 6 | | 30-97 | | | 3-70 |
| 7 | | | 30-97 | | 3-70 |
| 8 | 10-70 | 10-40 | | | 5-40 |
| 9 | | 30-97 | | 3-70 | |
| 10 | | | 30-97 | 3-70 | |

Method of Purifying and Recycling Synthetic Turf

The methods described herein may be used to purify, recycle and reuse synthetic turf, including turf described above, or other synthetic surfaces having chemical make-up similar to synthetic turf. A flowchart showing a version of the method is shown in FIG. 1.

Recycling synthetic turf begins with the removal of the material from the point of installation. Typically for a sports field, the synthetic turf is installed by unrolling a 15 foot wide by 150 foot long strip of turf. A field typically requires multiple rolls, which are laid out on the field side by side and seamed together to form the field. Infill is then installed. The infill may be one or more of sand, rubber, and/or any other suitable material as described previously. When a synthetic turf is removed, typically some of the infill (the onsite removal infill) is separated from the remainder of the infill. The onsite removal infill may be removed prior to the removal of the turf or at the same time. For example, a machine may collect the onsite removal infill and place it into a container or onto the field. The turf and the onsite removal infill may be removed at the same time by a machine or by hand (as described, for example, in U.S. Patent Application Publication Number 2012/0309858 entitled "Method for Recycling Synthetic Turf and Product" to Taylor et al.). The individual strips of turf may be re-rolled and shipped to a recycling facility. Alternatively, the strips of turf may be cut and optionally much of the infill is dumped out. The turf then may be downsized into sections (e.g., 1 foot by 1 foot for ease and efficiency of shipping). The downsizing may be accomplished by hand or machine. The machine may be large or small and may use rotary blades or knives or any of a variety of different methods known in the art. The downsized pieces are typically placed on pallets and shipped to a recycling facility. Prior to recycling the pieces may be downsized even further to a size suitable for the recycling equipment being used. The turf pieces may be downsized using any method known in the art (e.g., cutting, chopping, shredding, pulling, and the like). A suitable size for the turf pieces for recycling depends on the extrusion equipment being used, and a person of skill in the art familiar with that equipment is familiar with the size of material that is appropriate. Turf pieces that are ready for recycling are referred to herein as turf fragments. The sizes of the turf fragments are highly variable. Likewise, the turf fragments may have any shape. The turf fragments may include very small particles, or fines, that are almost dust-like, but also may include small irregularly shaped particles having a longest dimension of up to about 0.25 to 0.5 inch, and in many cases also may include ribbons of material having widths of less than 0.25 inch, but lengths up to about 2 inches. In some embodiments the very small particles, or fines, make up about 5% or less of the turf fragments. The turf fragments typically are a loosely packed low density solid material.

One surprising and unexpected problem was recently discovered in late 2012 and early 2013. The discovery came about because of equipment that was effectively destroyed during reclamation ad recycling attempts on turf which was said to be 95% (mass) clean of infill material based on standards used by turf removal companies such as Turf Reclamation Services ("TRS") of Cincinnati, Ohio. In that particular case, turf sections from a reclaimed field in Cincinnati—the "Cincinnati field"—had been received by Universal Textile Technologies, Inc. ("UTT") of Dalton, Ga. in late 2012 from TRS. No further purification steps to remove lingering infill materials were taken by UTT prior to cutting the turf rolls from the Cincinnati field. However, upon downsizing of the turf rolls, many problems quickly emerged. A third party, R.C. Plastics, Inc. of Dalton, Ga., was asked by UTT to assist with the downsizing step and the equipment used by RC Equipment was damaged and some of the equipment was made unusable (including blades and a fan) during initial cutting on the turf rolls from the Cincinnati field. Large amounts of rubber and sand were strewn all around the downsizing area. This result was a surprise considering the rolls were previously deemed 95% free of infill on arrival. Because blades and fans were being damaged, it was clear at the time that extrusion equipment including the screws in the extruders would likewise be heavily damaged and rendered inefficient in short order. Also, the composition of any extrudate would be compromised due to the unexpectedly high sand content.

After the experience with the Cincinnati field, UTT began considering ways to further purify turf rolls when received from a turf removal company. An opportunity to test new options emerged in early 2013 when a full synthetic turf field was returned to UTT in 2013 by TRS. The field was referenced by the name "Hoboken" based on the origination site and was again said to be 95% clean of infill material based on standards used by turf removal companies such as TRS. Forty-eight rolls of removed turf and residual infill were returned and each roll was weighed for accuracy to a total weight of 20,932 pounds. After using a new infill removal apparatus, the rolls were re-weighed yielding a total weight measurement of 13,051 pounds of turf (and, therefore, 7881 pounds of newly removed infill). The contribution of water to these weight measurements was determined to be negligible since little if any water loss was detected during storage and infill removal. The rolls were once again placed through a new infill removal apparatus and the rolls were again re-weighed yielding a total weight measurement of 12,537 pounds of turf (and, therefore, 478 pounds of newly removed infill). The total percentage of removed infill by mass equaled approximately 40% (wt) of the turf rolls when they were received from TRS as opposed to the 95% number that was previously given. Because the bases described herein are given in percentages, the TRS data may have been roughly accurate based on the total mass of infill presumed to be entrained with the turf prior to initial onsite removal by TRS, but the newly discovered information at UTT regarding subsisting infill—particularly, silica-based elements—strongly suggested more steps and processes were needed in order to get reclaimed synthetic turf in better condition for recycling.

Claims of 95% (wt) or more of onsite infill removal where turf is being reclaimed from a field (such as, for example, U.S. Patent Application Publication Number 2012/0309858 entitled "Method for Recycling Synthetic Turf and Product" to Taylor et al.) turn out to be a mere first step to provide a reliably "clean" turf roll for further recycle processing. The infill removal requirements are simply turning out to be considerably more complex than previously thought. The reason for this previously unappreciated complexity is thought to be based primarily on the dynamic nature of bulk densities of silica-based materials entrained within artificial turf.

Migration of sand within natural turf on sporting surfaces such as, for example, natural putting greens, has been shown to create high bulk density areas of sand that negatively affect grass growth (see, e.g., Taylor, D. H., and G. R. Blake. 1981. Laboratory evaluation of soil mixtures for sports turf. Soil Science Society of America Journal 45(5):936-940), but no such phenomenon has been considered with regards to the recycling of artificial turf. This is true at least because (1) attempts at recycling infill-based artificial turf systems are relatively new and (2) artificial turf does not grow like natural turf, so no studies were needed to consider the negative effects of sand migration/compaction and high bulk density pockets on turf growth for such fields. When artificial turf fields including infill are used for many years, pockets of compacted infill invariably develop. Removed rolls that appear to have a relatively small volume of infill apparently have significantly more mass of compacted sand than previously thought. After the experience with the Cincinnati field and Hoboken field projects, these pockets of compacted sand with much higher than average bulk densities within reclaimed turf present a significant source of undesirable (and effectively unrecyclable) material subsisting within reclaimed but unprocessed artificial turf rolls. If and when this subsisting material is not properly removed, cutting equipment is susceptible to damage and/or destruction, along with any other equipment such as, for example, extruding equipment that may be used to form new products from recycled turf fibers and backing.

Figure 2:
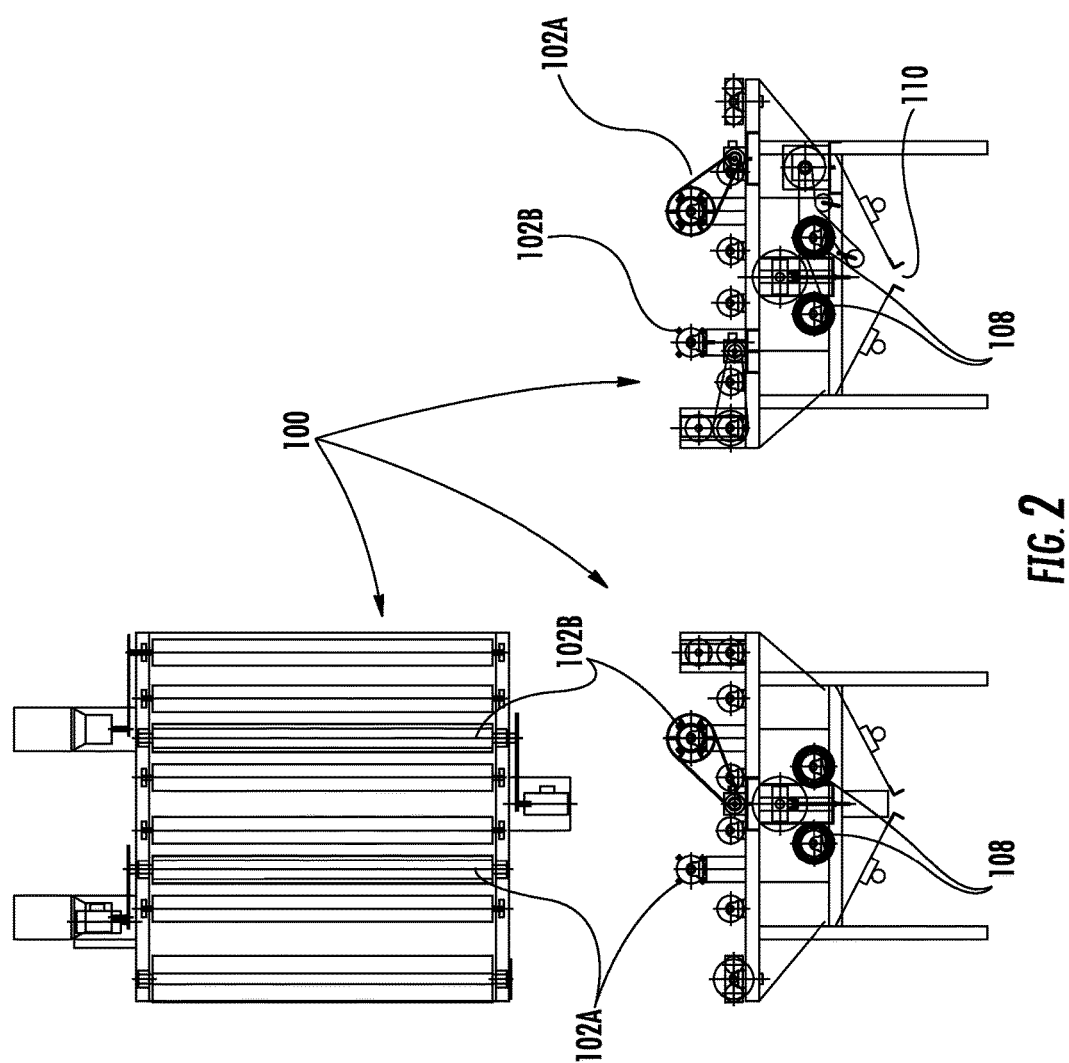
FIG. 2 shows three different somewhat schematic views of a turf purification apparatus.
Figure 3:
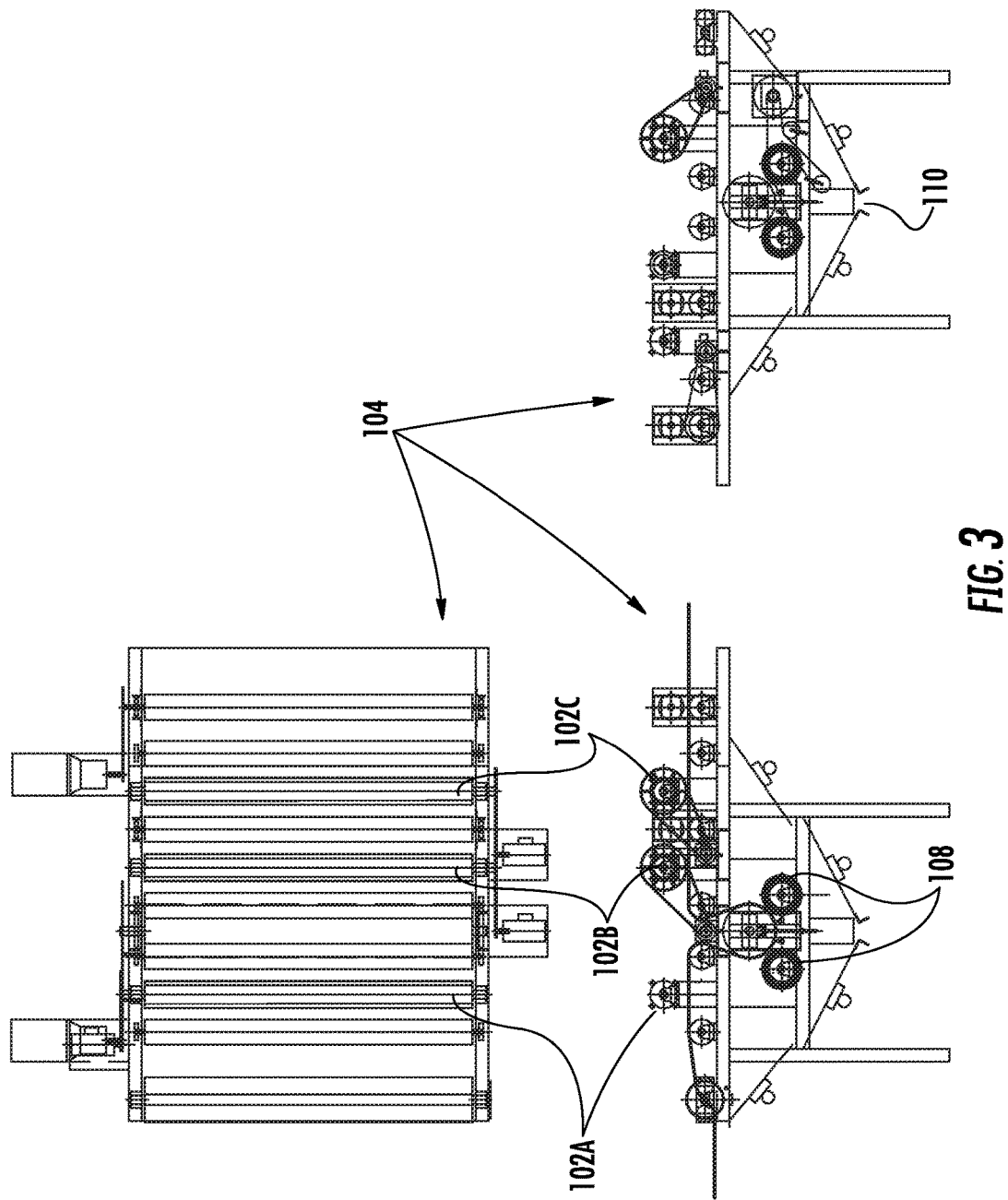
FIG. 3 shows three different somewhat schematic views of a modified turf purification apparatus.

After different rounds of experimentation using portions from the Hoboken field, UTT conceived and devised a turf purification apparatus 100 shown in FIG. 2. The turf purification apparatus 100 preferably includes at least two beater bars 102A and 102B and optionally three or more beater bars 102C as shown for example on a modified turf purification apparatus 104 shown in FIG. 3. The modified version of the turf purification apparatus 104 shown in FIG. 3 includes a side view of a turf roll 106 being fed through the turf purification apparatus 104. The turf roll 106 is physically beaten by the beater bars 102 and brushed by one or more brushes 108 rotating on their length axes. The various parts of the purification apparatus are preferably driven by electric motors as shown in FIGS. 2 and 3

Figure 4:
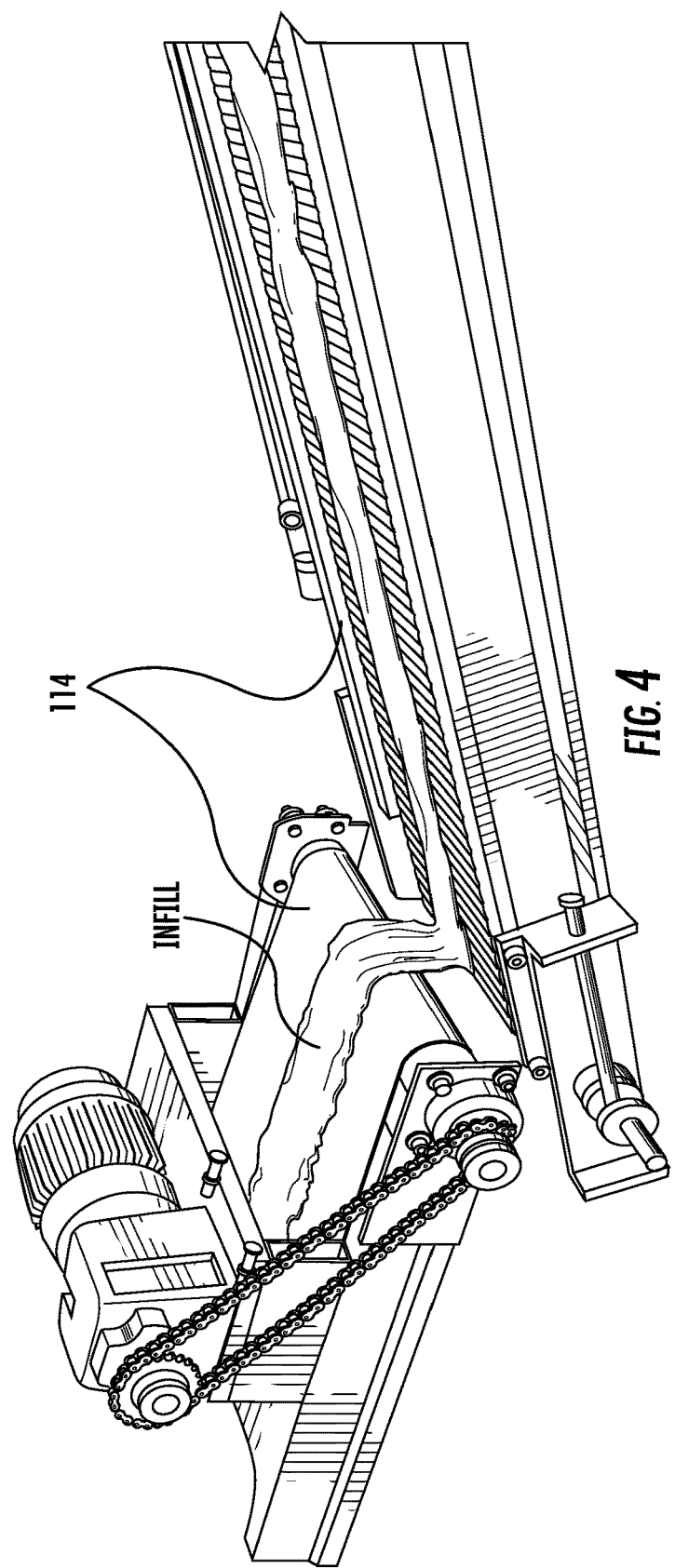
FIG. 4 shows a conveyance apparatus moving removed infill material from a turf purification apparatus.
Figure 5:
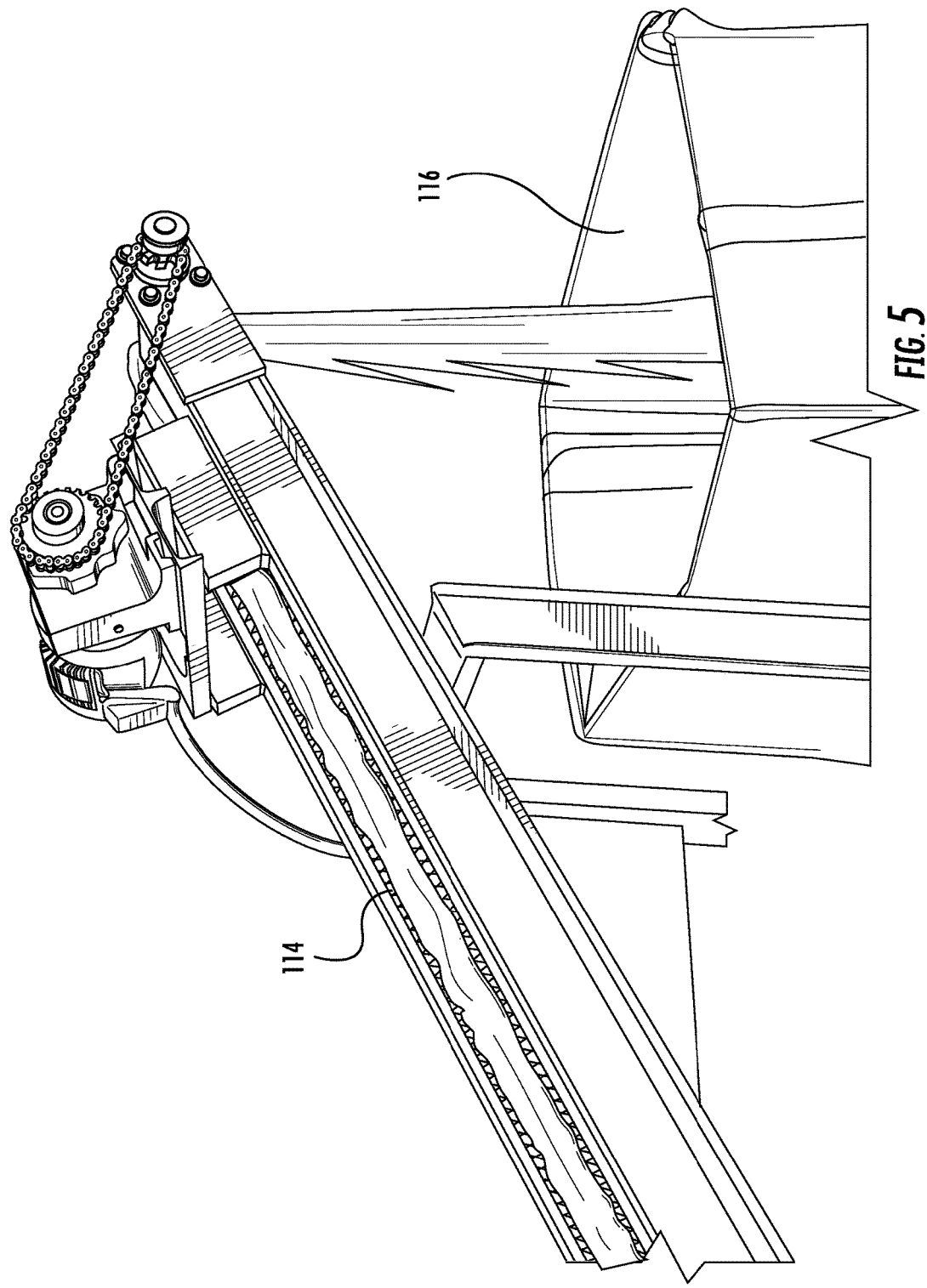
FIG. 5 shows a conveyance apparatus moving removed infill material to a portable storage container.

The residual infill removed from the turf roll 106 drops out at an effluent location 110, preferably directed by the help of one or more vibrating members 112. Residual infill material removed from the turf roll 106 preferably lands on a conveyance device 114 (e.g., one or more conveyor belts) and is conveyed to a portable container 116 as shown, for example, in FIGS. 4-5. The turf roll 106 can be cycled through the purification apparatus 100 twice if desired for higher purity, but cycling the turf roll through any version of the purification apparatus more than twice was deemed inefficient based on the diminished improvement of purity. Cycling the turf roll 106 through the purification apparatus 104 one time was determined to be an optimal solution considering efficiency and desired purity at that stage of the process. Using a single cycle, from about 70,000 to about 100,000 ft$^2$ of turf rolls containing typical residual infill can be purified to high levels (i.e., down to from about 4% (wt) to about 2% (wt) infill) for further processing in from about 10 to about 18 hours.

Figure 6:
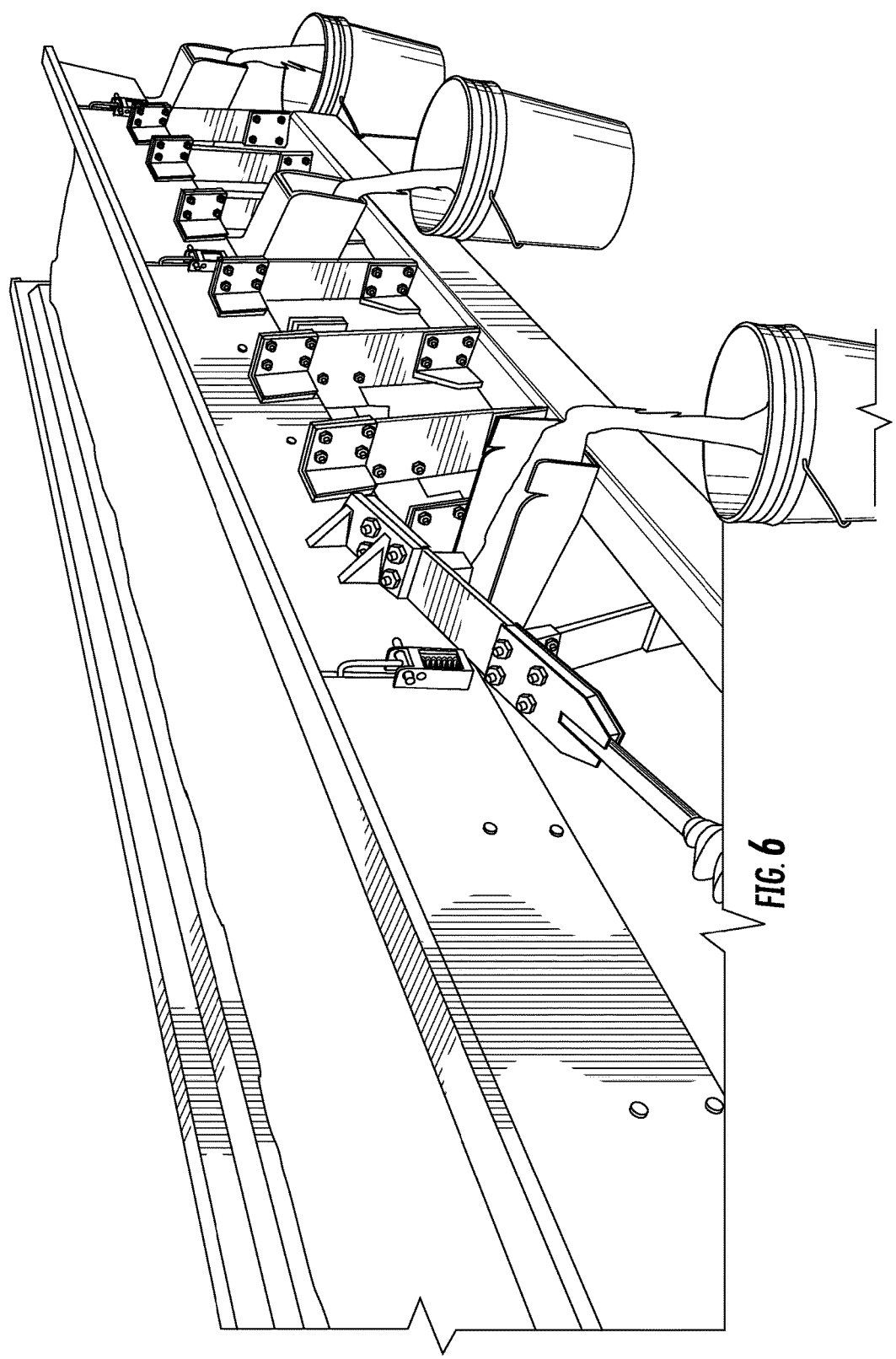
FIG. 6 shows a sorter with multiple tiers of mesh size, sorting removed infill material.

The disclosed method disclosed herein further includes downsizing steps and separation steps for further separating from about 1% (wt) to about 3% (wt) of non-recyclable components (infill) from the turf before extrusion. After passing the turf roll 106 through the modified turf purification apparatus 104, the turf roll 106 is preferably cut using one or more cutting technologies for cutting synthetic turf or carpet. The cutting step loosens much of the ingrained infill material and allows for more infill to be removed during sorting. After cutting, the cut material is sorted using a sorter to separate sand, rubber, and chopped turf material. (In the case of the Hoboken field, the amount of infill removed during sorting was approximately 150 pounds.) The sorter is preferably a vibratory sorter with multiple sections having different mesh sizes such as, for example, the vibratory conveyor available from LMC, INC. of Donalsville, Ga. as shown in FIG. 6. After a first round of sorting, the chopped material is further downsized, preferably by grinding, to pieces having a longest length dimension of no more than approximately 0.25 inches. The ground material is then sorted using a sorter to further separate sand, rubber, ground turf material, and any other trash or unprocessible material. At this point, less than 1% (wt) of the remaining material separated as ground turf material is properly classifiable as infill (sand and/or rubber).

The ground turf material is then preferably densified prior to extrusion. The densification process includes melting any thermoplastic material portion of the synthetic turf after grinding using a controlled heat source while turf fragments are conveyed (e.g., a conveyor belt) to the extruder. During conveyance, the temperature preferably ranges from about 250° F. to about 350° F. for an exposure time period of from about 0.75 minutes to about 1.5 minutes. The densification step preferably curls polypropylene and/or polyethylene materials thereby densifying them while simultaneously attaching or otherwise comingling such materials with polyurethane particles, fillers or other materials that are not influenced by the heat. Agglomeration was a prior option that proved to be considerably expensive, not many agglomerator contractors were available, and agglomerators were not particularly helpful with greige or uncoated turf. The densification step described herein allows increased extruder capacity by two or three times (by mass) than without conducting a densification step. The agglomeration process is not very a good process for conduxing of materials which are uncoated. Materials such as polyethylenes and or polyolefins alone would melt and stop up an agglomerator, so it is desirable to be able to have the option of foregoing agglomeration and using the densification step described above.

The step of extruding the mixture of synthetic turf fragments and additive may be carried out with any equipment suitable for extrusion or known to one of skill in the art. A number of different extruders may be used for this process depending upon the type of mixing or heating that is desired. Examples of suitable extruders include single screw and twin screw extruders. The twin screw extruder can have co-rotating or counter rotating screws and the single screw extruder has one rotating screw. The screws can be designed for different purposes but have the capacity to heat and mix the material. Extruders typically have variable screw speeds and variable heating as well as variable feed rates. The appropriate speed and heat rate is determined by the type of output desired.

Extrusion is carried out at elevated temperatures. In some embodiments the temperature during extrusion is between about 200° F. and about 500° F., or between about 250° F. and about 450° F. In some embodiments the temperature during extrusion is between about 350° F. and about 400° F. In some embodiments the rate of extrusion is from about 3 to about 2,000 lbs/hour, or from about 100 to about 500 lbs/hour, or from about 300 to about 500 lbs/hour.

Extrusion can be carried out using any size die that will provide a product of the desired size and shape, but in some embodiments is carried out using a die that has an aperture in the shape of a slot. The size of the slot may vary depending on the size of the extruder, the size of the available cutting equipment, and/or the desired use of the extrudate. One of skill in the art can easily determine the appropriate size of the slot based on the available equipment and desired end use of the product.

Figure 7:
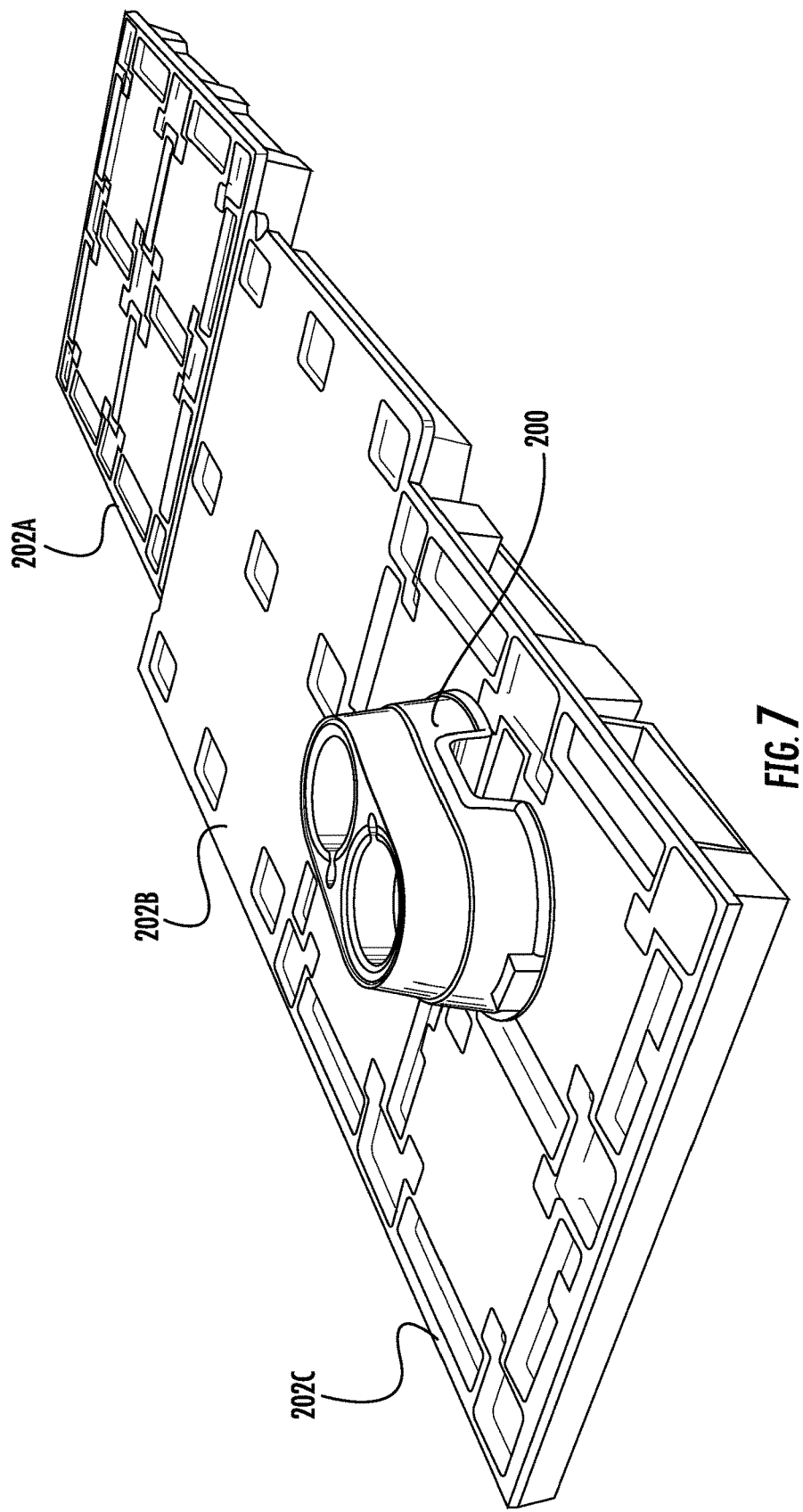
FIG. 7 shows products made from extrudate pellets that were created by the recycling method described herein.

The extrudate is preferably pelletized and can be used as the primary component to create various structures via injection molding such as, for example, a dog bowl 200 and pallets 202A, 202B, and 202C as shown in FIG. 7. In some cases, because of the high purity of the extrudate, the pellets can be used as the only component via injection molding to create these types of products.

Figure 8:
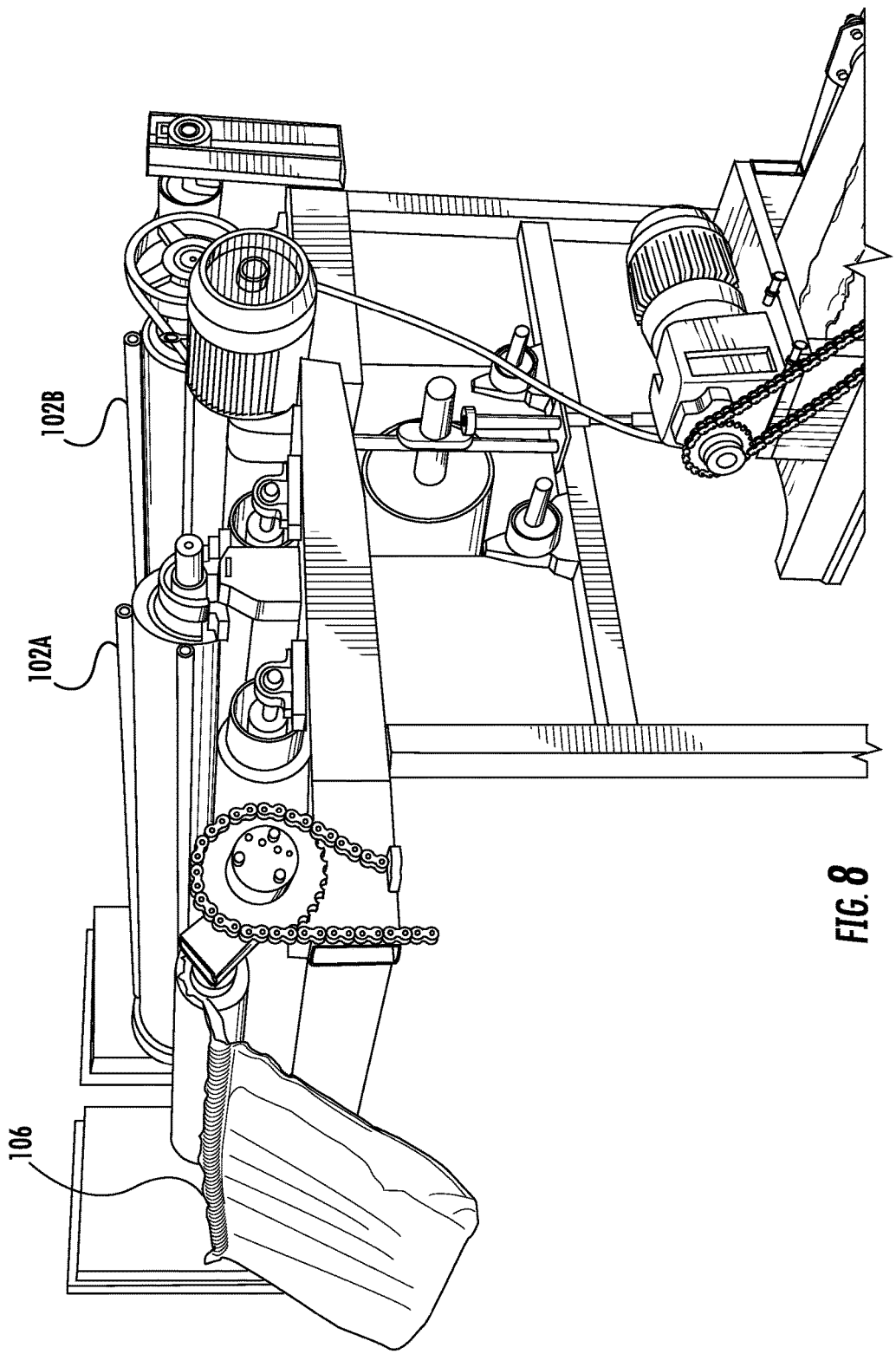
FIG. 8 shows a turf purification apparatus in action.
Figure 9:
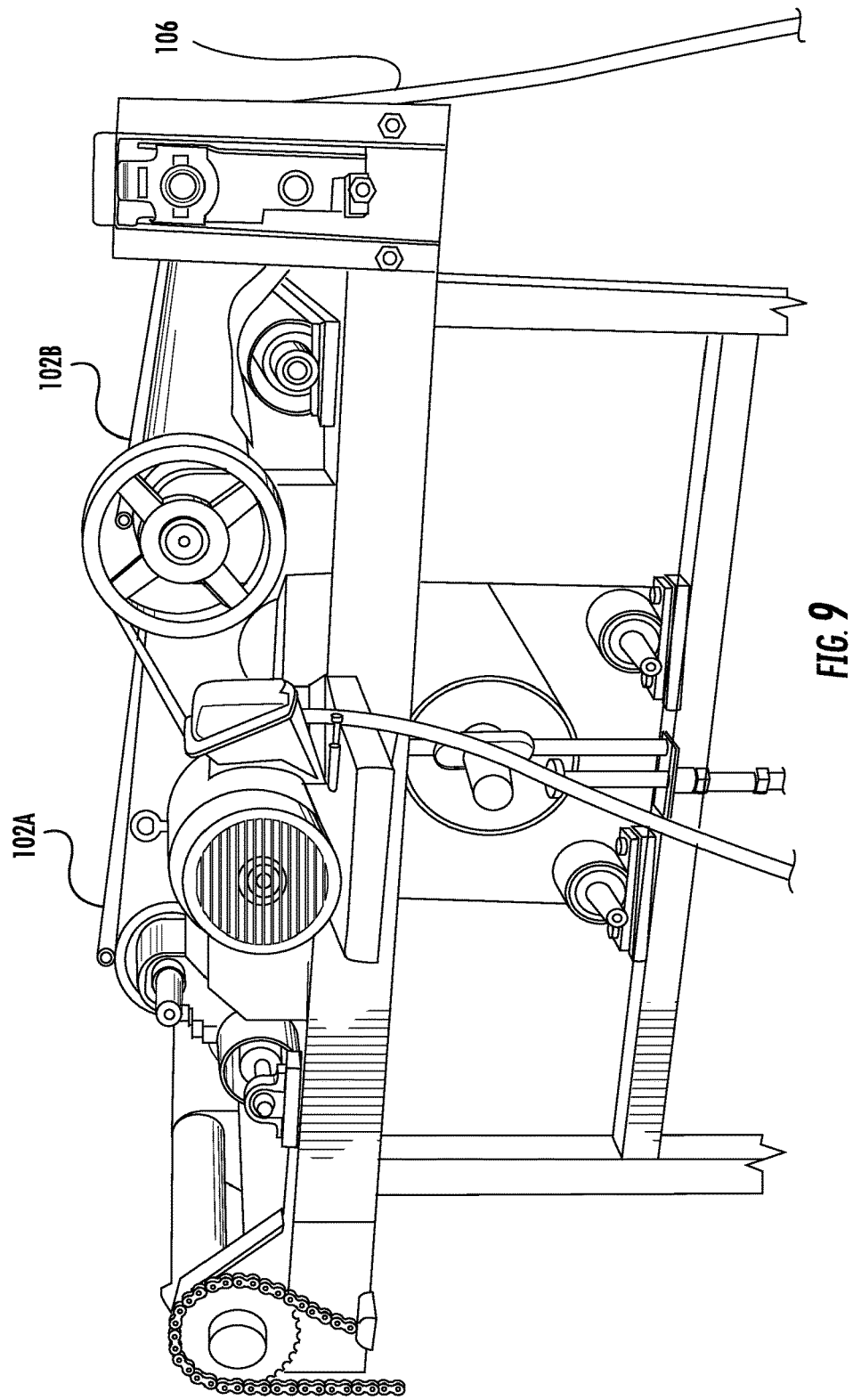
FIG. 9 shows the turf purification apparatus of FIG. 8 in action.

Actual images of the turf purification apparatus 100 are shown in FIGS. 8-10.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for purifying used synthetic turf in preparation for further recycling, wherein the used synthetic turf comprises infill including sand, the method comprising the steps of:

removing a section of used synthetic turf from an installation site, the section of used synthetic turf including residual infill including sand;

feeding the section of used synthetic turf adjacent to a rotating beater roll wherein a backing surface of the section of used synthetic turf is directly contacted by the rotating beater roll to knock compacted sections of sand infill loose within the section of used synthetic turf;

passing the section of used synthetic turf adjacent to a rotating brush roll wherein a turf filament surface is directly contacted by the rotating brush roll to knock any entrained infill material loose from the section of used synthetic turf;

cutting the section of used synthetic turf into subsections of used synthetic turf, wherein the subsections of used synthetic turf further include residual infill;

sorting the subsections of used synthetic turf to separate out residual infill; and grinding the subsections of used synthetic turf into used synthetic turf fibers, wherein the used synthetic turf fibers further include residual infill and wherein a longest length dimension of the used synthetic turf fibers is no greater than about 0.25 inches.

2. The method of claim 1 further comprising the steps of:
channeling infill material knocked loose from the section of used synthetic turf to a first repository; and
sorting separate components of the channeled infill material knocked loose from the section of used synthetic turf.

3. The method of claim 1 wherein the step of sorting the used synthetic turf to separate out residual infill further comprises the step of:
channeling residual infill knocked loose from the section of used synthetic turf during the cutting to a second repository.

4. The method of claim 1 further comprising a subsequent step of sorting separate components of the used synthetic turf fibers to further separate ground synthetic turf fibers from remaining residual infill, thereby providing sorted ground synthetic fibers.

5. The method of claim 4 further comprising a step of heating the sorted ground synthetic fibers whereby thermoplastic material included within the sorted ground synthetic fibers becomes melted, thereby densifying thermoplastic materials present within the sorted ground synthetic fibers to provide densified synthetic fibers.

6. The method of claim 5 wherein the step of heating the sorted ground synthetic fibers further comprises the step of heating the sorted ground synthetic fibers at a temperature ranging from about 250° C. to about 350° C. for a duration of from about 0.75 minutes to about 1.5 minutes.

7. The method of claim 5 further comprising a step of extruding the densified synthetic fibers to form a pelletized extrudate.

8. The method of claim 1, wherein the step of sorting the subsections of used synthetic turf to separate out residual infill further comprises sorting the subsections of used synthetic turf, via vibrations, to separate out the residual infill further.

9. The method of claim 1, wherein the subsections of used synthetic turf are sized approximately 1 foot by 1 foot.

* * * * *